(12) United States Patent
Padmanabhan et al.

(10) Patent No.: US 8,787,349 B2
(45) Date of Patent: Jul. 22, 2014

(54) METHOD AND SYSTEM FOR REDUCING TIMING UNCERTAINTY OF DATA TRANSMISSION AND RECEPTION

(75) Inventors: Uday Padmanabhan, Chandler, AZ (US); Bing Xu, Gilbert, AZ (US); Kenneth Edward Stebbings, Crystal Lake, IL (US)

(73) Assignee: Intel IP Corporation, Santa Clara, CA (US)

(*) Notice: Subject to any disclaimer, the term of this patent is extended or adjusted under 35 U.S.C. 154(b) by 0 days.

(21) Appl. No.: 13/040,495

(22) Filed: Mar. 4, 2011

(65) Prior Publication Data

US 2012/0224518 A1 Sep. 6, 2012

(51) Int. Cl.
*H04J 3/06* (2006.01)

(52) U.S. Cl.
USPC .......................... 370/350; 370/503

(58) Field of Classification Search
USPC ............... 370/235, 345, 354, 350; 455/73
See application file for complete search history.

(56) References Cited

U.S. PATENT DOCUMENTS

| | | | |
|---|---|---|---|
| 6,188,286 B1 | 2/2001 | Hogl et al. ........................ 331/2 |
| 7,948,964 B1 | 5/2011 | Khlat et al. | |
| 8,085,754 B1 * | 12/2011 | Khlat et al. ..................... 370/350 |
| 2009/0257527 A1 | 10/2009 | Kluge et al. | |
| 2010/0074311 A1 * | 3/2010 | Kopmeiners ................. 375/220 |
| 2010/0215133 A1 * | 8/2010 | Stebbings et al. ............ 375/354 |
| 2011/0176535 A1 * | 7/2011 | Lipka et al. .................... 370/350 |
| 2011/0194659 A1 * | 8/2011 | Kenney ......................... 375/355 |

FOREIGN PATENT DOCUMENTS

| | | | | |
|---|---|---|---|---|
| EP | 1515457 | 3/2005 | ............... | H04B 7/26 |
| EP | 2110954 | 10/2009 | ............... | H04B 1/04 |
| EP | 2154788 | 2/2010 | ............... | H04B 1/40 |
| WO | WO 2010/025753 | 3/2010 | ............... | H04B 7/26 |

OTHER PUBLICATIONS

Extended European Search Report; Application No. 12158322.3-1852 / 2495880; pp. 5, Apr. 22, 2013.

* cited by examiner

*Primary Examiner* — Jung Park
(74) *Attorney, Agent, or Firm* — Baker Botts L.L.P.

(57) ABSTRACT

In accordance with the present disclosure, disadvantages and problems associated with timing accuracies of higher data rate communications systems may be reduced. In accordance with one embodiment of the present disclosure a wireless communication element comprises a first controller configured to generate data transfer information indicating a trigger value. The wireless communication element further comprises a second controller communicatively coupled to the first controller. The second controller comprises a counter configured to increment a counter value and is configured to receive the data transfer information from the first controller. The second controller is further configured to generate a data transfer trigger when the counter value corresponds with the trigger value such that the wireless communication element initiates a data transfer with a second wireless communication element in response to the data transfer trigger.

20 Claims, 5 Drawing Sheets

METHOD AND SYSTEM FOR REDUCING TIMING UNCERTAINTY OF DATA TRANSMISSION AND RECEPTION

TECHNICAL FIELD

The present disclosure relates generally to mobile communication networks, and more particularly, to a method and system for reducing timing uncertainty over packet-based links and different clock domains.

BACKGROUND

Telecommunications systems, cable television systems and data communication networks are becoming increasingly faster due to market and consumer demand. As these communications systems, especially mobile communications systems, move to higher data rates, the timing accuracy requirements for transmitting and receiving signals and information also increase.

SUMMARY

In accordance with the present disclosure, disadvantages and problems associated with timing accuracies of higher data rate communications systems may be reduced. In accordance with one embodiment of the present disclosure a wireless communication element comprises a first controller configured to generate data transfer information indicating a trigger value. The wireless communication element further comprises a second controller communicatively coupled to the first controller. The second controller comprises a counter configured to increment a counter value and is configured to receive the data transfer information from the first controller. The second controller is further configured to generate a data transfer trigger when the counter value corresponds with the trigger value such that the wireless communication element initiates a data transfer with a second wireless communication element in response to the data transfer trigger.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

The telecommunications industry, especially the wireless communication industry, is an industry that requires increased data transmission rates. As the systems move toward higher data rates, the timing accuracy requirements for transmission of commands for performing time critical events (e.g., data transmission and reception) within communications devices (e.g., mobile communications devices, such as mobile phones) may also increase.

Figure 1:
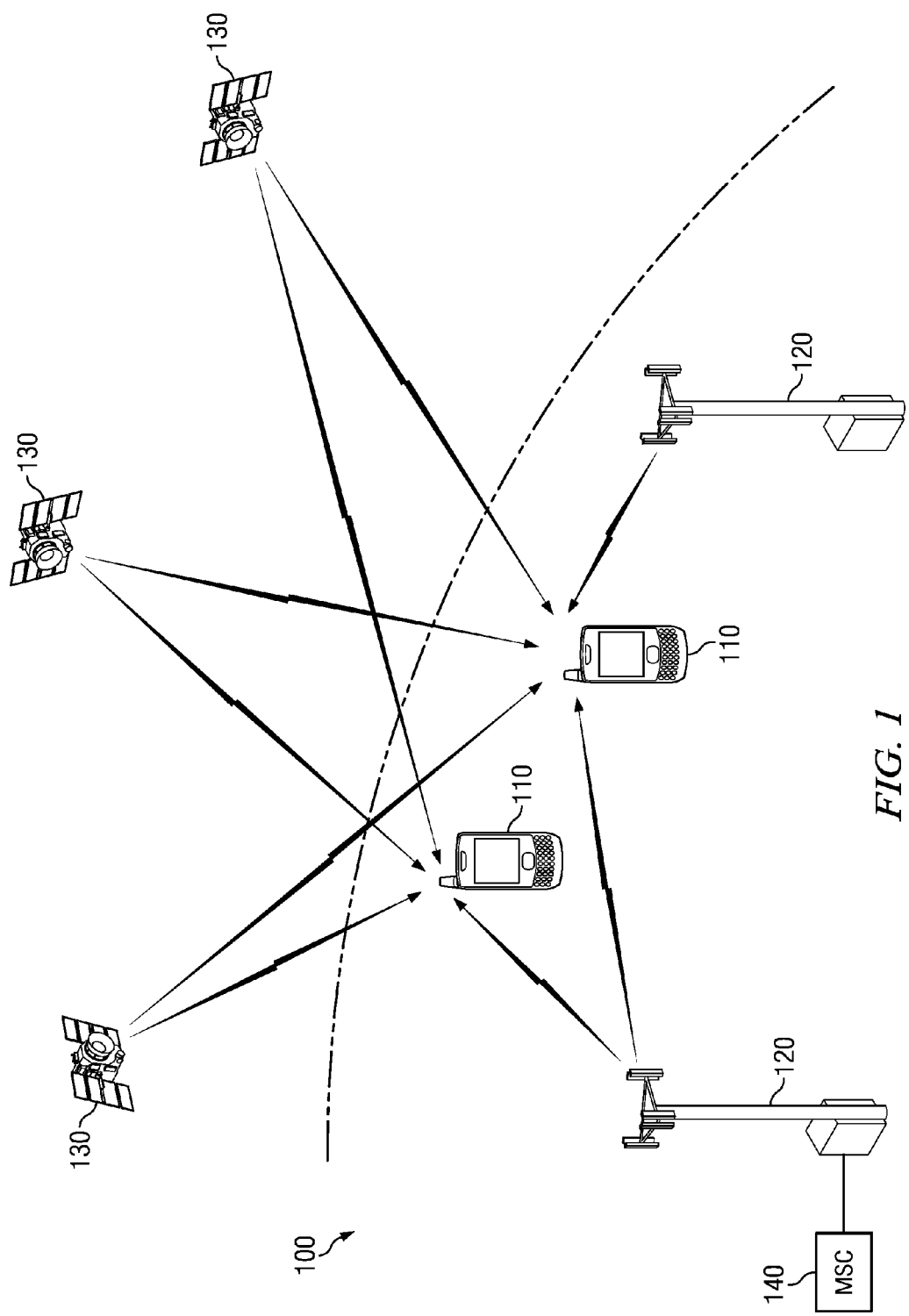
FIG. 1 illustrates a block diagram of an example wireless communication system, in accordance with certain embodiments of the present disclosure.

FIG. 1 illustrates a block diagram of an example wireless communication system 100, in accordance with certain embodiments of the present disclosure. For simplicity, only two terminals 110 and two base stations 120 are shown in FIG. 1. A terminal 110 may also be referred to as a remote station, a mobile station, an access terminal, user equipment (UE), a wireless communication device, a cellular phone, or some other terminology. A base station 120 may be a fixed station and may also be referred to as an access point, a Node B, or some other terminology. A mobile switching center (MSC) 140 may be coupled to the base stations 120 and may provide coordination and control for base stations 120.

A terminal 110 may or may not be capable of receiving signals from satellites 130. Satellites 130 may belong to a satellite positioning system such as the well-known Global Positioning System (GPS). Each GPS satellite may transmit a GPS signal encoded with information that allows GPS receivers on earth to measure the time of arrival of the GPS signal. Measurements for a sufficient number of GPS satellites may be used to accurately estimate a three-dimensional position of a GPS receiver. A terminal 110 may also be capable of receiving signals from other types of transmitting sources such as a Bluetooth transmitter, a Wireless Fidelity (Wi-Fi) transmitter, a wireless local area network (WLAN) transmitter, an IEEE 802.11 transmitter, and any other suitable transmitter.

In FIG. 1, each terminal 110 is shown as receiving signals from multiple transmitting sources simultaneously, where a transmitting source may be a base station 120 or a satellite 130. In certain embodiments, a terminal 110 may also be a transmitting source. In general, a terminal 110 may receive signals from zero, one, or multiple transmitting sources at any given moment.

System 100 may be a Code Division Multiple Access (CDMA) system, a Time Division Multiple Access (TDMA) system, or some other wireless communication system. A CDMA system may implement one or more CDMA standards such as IS-95, IS-2000 (also commonly known as "1x"), IS-856 (also commonly known as "1 xEV-DO"), Wideband-CDMA (W-CDMA), and so on. A TDMA system may implement one or more TDMA standards such as Global System for Mobile Communications (GSM). The W-CDMA standard is defined by a consortium known as 3GPP, and the IS-2000 and IS-856 standards are defined by a consortium known as 3GPP2.

In many communications networks, information may be transmitted in data packets or "bursts." In order to minimize co-channel interference among users and to maximize the system capacity of network 100, transmission and reception of data packets between terminals 110, base stations 120 and satellites 130 may be based on specific instances of time. Due to less time allowed for transmission and reception of data packets, as the data transmission rate increases (e.g., symbol rate) the timing of transmission and reception of packets may need to be more accurate. It is understood that data transmission and reception in a communication network may be collectively referred to as a data transfer or a data exchange.

For example, a Gaussian Minimum Shift Keying (GMSK)/Enhanced Data rates for GSM Evolution (EDGE) burst may be required to be transmitted within an assigned time-slot with a timing accuracy that needs to be better than a quarter of a GMSK symbol period. The period of a GMSK symbol is 3.7 micro-seconds (μs), therefore the timing accuracy of transmission within an assigned time-slot may be 0.925 μs (3.7 μs/4). In contrast, a 4G (fourth generation) symbol rate may be much faster than a GMSK/EDGE symbol rate such that the timing accuracy of data packet transmission must be within 0.065 μs of a specific transmission time. Accordingly, it may be advantageous to reduce timing inaccuracies and uncertainties such that information may be transferred in its designated time slots and within the narrow timing accuracy constraints of high data rate systems.

The timing of data packet transfers (e.g., transmission or reception) by a transmitting and receiving element of system 100 (e.g., a terminal 110, base station 120, or satellite 130) may be controlled by a timing trigger. In some systems, the timing trigger may comprise a time accurate strobe (TAS). Timing inaccuracies and uncertainties may occur as timing triggers are passed from different components included within a transmitting and receiving element of system 100. The uncertainties may occur as the timing triggers pass through different components operating under asynchronous clock domains, thus creating asynchronous clock domain transfers. Additionally, as triggers are transferred over high speed links to multiple system components, the incidence of bit error may be increased, thus corrupting the timing triggers and potentially causing timing uncertainties.

Therefore, in accordance with the present disclosure, transmitting and receiving elements of system 100 (e.g., terminal 110, base station 120, or satellite 130) may be configured to reduce timing inaccuracies by reducing or eliminating the number of clock domain transfers of timing triggers that initiate packet transmission or reception. As discussed in further detail below, transmitting and receiving elements of system 100 may be configured such that the timing triggers of data packets are based on a counter initiated upon the transfer of a reference subframe of a data packet. When the reference subframe is transmitted or received, the counter may be started within the transmitting or receiving clock domain. The timing triggers for the transfer of subsequent subframes may be based on the counter and may not pass to another clock domain such that the timing triggers may not be affected by clock domain transfers. Additionally, by reducing or eliminating the number of clock domain transfers of the timing triggers, bit errors due to those transfers may also be reduced or eliminated. Accordingly, the transmitting and receiving elements of system 100 may be configured such that timing uncertainties of data transfers due to domain transfers and bit errors may be reduced or eliminated.

Figure 2:
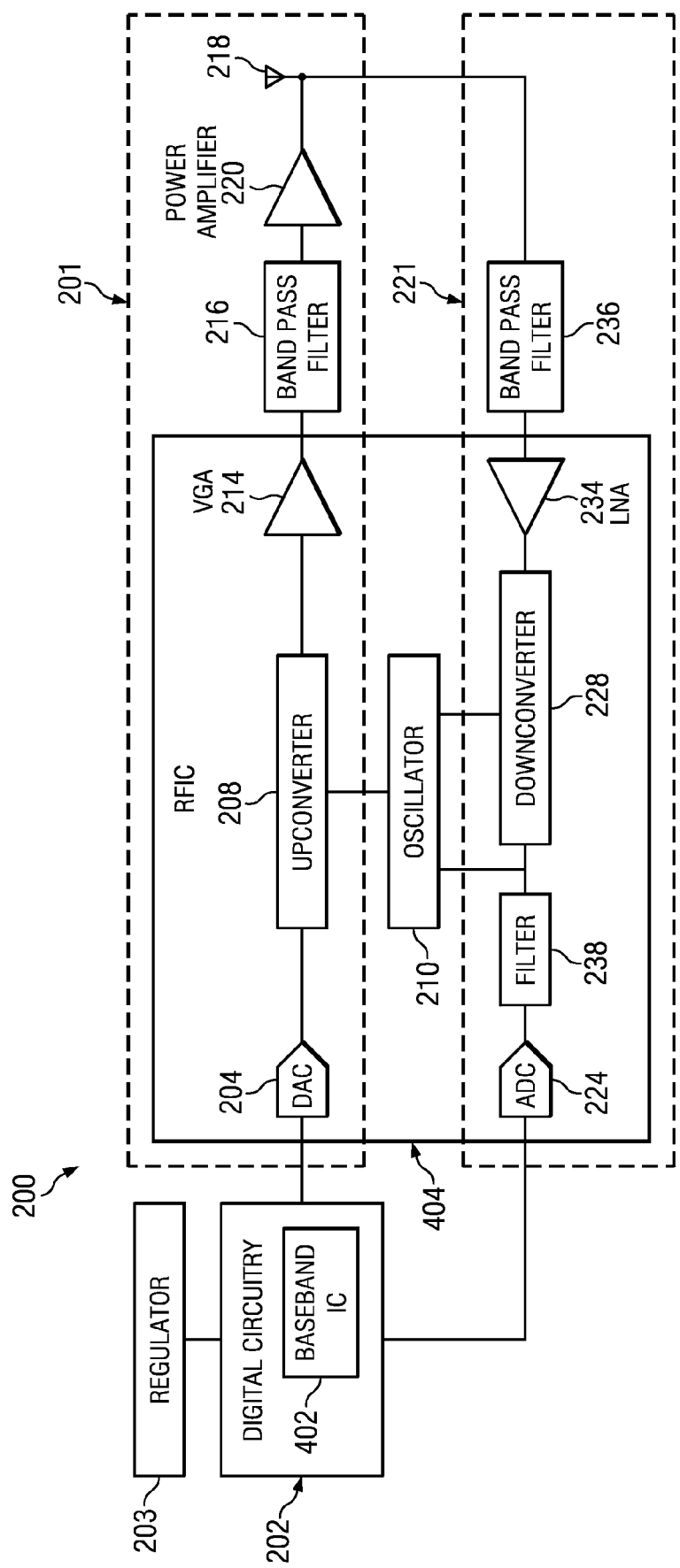
FIG. 2 illustrates a block diagram of selected components of an example transmitting and/or receiving element.

FIG. 2 illustrates a block diagram of selected components of an example transmitting and/or receiving element 200 (e.g., a terminal 110, a base station 120, or a satellite 130), configured to reduce timing uncertainties in accordance with certain embodiments of the present disclosure. Element 200 may include a transmit path 201 and/or a receive path 221. Depending on the functionality of element 200, element 200 may be considered a transmitter, a receiver, or a transceiver.

Digital circuitry 202 may include any system, device, or apparatus configured to process digital signals and information received via receive path 221, and/or configured to process signals and information for transmission via transmit path 201. Such digital circuitry 202 may include one or more microprocessors, digital signal processors, and/or other suitable devices. As described in further detail below, digital circuitry 202 and components of transmit path 201 and receive path 221 may be configured such that element 200 may transmit or receive subframes according to timing triggers that may not pass through one or more clock domains, thus reducing timing uncertainties in element 200.

Transmit path 201 may include a digital-to-analog converter (DAC) 204. DAC 204 may be configured to receive a digital signal from digital circuitry 202 and convert such digital signal into an analog signal. Such analog signal may then be passed to one or more other components of transmit path 201, including upconverter 208.

Upconverter 208 may be configured to frequency upconvert an analog signal received from DAC 204 to a wireless communication signal at a radio frequency based on an oscillator signal provided by oscillator 210. Oscillator 210 may be any suitable device, system, or apparatus configured to produce an analog waveform of a particular frequency for modulation or upconversion of an analog signal to a wireless communication signal, or for demodulation or downconversion of a wireless communication signal to an analog signal. In some embodiments, oscillator 210 may be a digitally-controlled crystal oscillator.

Transmit path 201 may include a variable-gain amplifier (VGA) 214 to amplify an upconverted signal for transmission, and a bandpass filter 216 configured to receive an amplified signal VGA 214 and pass signal components in the band of interest and remove out-of-band noise and undesired signals. The bandpass filtered signal may be received by power amplifier 220 where it is amplified for transmission via antenna 218. Antenna 218 may receive the amplified and transmit such signal (e.g., to one or more of a terminal 110, a base station 120, and/or a satellite 130). Receive path 221 may include a bandpass filter 236 configured to receive a wireless communication signal (e.g., from a terminal 110, a base station 120, and/or a satellite 130) via antenna 218. Bandpass filter 236 may pass signal components in the band of interest and remove out-of-band noise and undesired signals. In addition, receive path 221 may include a low-noise amplifiers (LNA) 224 to amplify a signal received from bandpass filter 236.

Receive path 221 may also include a downconverter 228. Downconverter 228 may be configured to frequency downconvert a wireless communication signal received via antenna 218 and amplified by LNA 234 by an oscillator signal provided by oscillator 210 (e.g., downconvert to a baseband signal).

Receive path 221 may further include a filter 238, which may be configured to filter a downconverted wireless communication signal in order to pass the signal components within a radio-frequency channel of interest and/or to remove noise and undesired signals that may be generated by the downconversion process. In addition, receive path 221 may include an analog-to-digital converter (ADC) 224 configured to receive an analog signal from filter 238 and convert such analog signal into a digital signal. Such digital signal may then be passed to digital circuitry 202 for processing.

DAC 204, upconverter 208 and VGA 214 of transmit path 201, oscillator 210, and ADC 224, filter 238, downconverter 228 and LNA 234 of receive path 221 may be included in a radio frequency integrated circuit (RFIC) 404. RFIC 404 may also include one or more microprocessors, digital signal processors (DSP), microcontrollers and/or other suitable devices (not expressly shown). RFIC 404 may act as a radio transceiver of element 200 and may accordingly be configured to activate antenna 218 to transmit and/or receive signals.

In the present embodiment, digital circuitry 202 and RFIC 404 may be configured such that element 200 may transmit or receive subframes according to timing triggers that may not pass through one or more clock domains, thus reducing timing uncertainties in transmit path 201 and receive path 221 from circuitry 202 to antenna 218 of element 200. In the present embodiment, digital circuitry 202 may include a digital baseband integrated circuit (baseband IC) 402 configured to process communication functions of element 200 and that is communicatively coupled to RFIC 404 (not expressly shown). Baseband IC 402 may comprise one or more microprocessors, digital signal processors (DSP), microcontrollers and/or other suitable devices.

For illustrative purposes, the operations of baseband IC 402 and RFIC 404 may be described specifically with respect to packet transmission operations. However, it is understood that the same or similar operations may be performed for any other type of data transfer, such as packet reception. In the present example, baseband IC 402 may be configured to transmit packet transmission information to RFIC 404. In some instances, the packet transmission information may comprise configuration information used to configure RFIC 404 for packet transmission operations. In other instances, the packet transmission information may comprise a timing trigger such as a time accurate strobe (TAS) transmitted after configuration information associated with the TAS has been sent to RFIC 404.

RFIC 404 may be configured to initiate transmission of data packets between element 200 (e.g., a terminal 110) and another transceiving element (e.g., a base station 120) via antenna 218, based on the transmission information received from baseband IC 402. RFIC 404 may receive configuration information from baseband IC 402 and may accordingly be configured to transmit a data packet (e.g., a subframe of data) based on the configuration information. The configuration information may also direct RFIC 404 to start a trigger counter upon transmitting the subframe. The subframe corresponding to the initiation of the trigger counter may be referred to as a reference subframe, and the configuration information associated with the reference subframe may be referred to as reference configuration information.

RFIC 404 may also receive a timing trigger (e.g., TAS) from baseband IC 402 to trigger the transmission of the reference subframe. This timing trigger corresponding with the reference subframe may be referred to as a "reference trigger." Upon receiving the reference trigger, RFIC 404 may transmit the reference subframe and initiate the trigger counter. Due to timing inaccuracies corresponding with clock domain transfers of the reference trigger, as the reference trigger is transmitted from baseband IC 402 to RFIC 404 and as the reference trigger passes through various components of RFIC 404, the transmission timing of the reference subframe may also have timing uncertainties. However, the timing triggers for transmission of subframes transmitted after the reference subframe ("subsequent subframes") may be based on the trigger counter and configuration information associated with transmission of subsequent subframes as received from baseband IC 402.

The trigger counter may be within the transmission clock domain of RFIC 404, such that the timing trigger for data transmission does not pass through multiple clock domains, thus reducing timing uncertainties. Further, RFIC 404 may receive the configuration information for a subsequent subframe from baseband IC 402 before the subsequent subframe should be sent. Consequently, reception of the configuration information may not be as time critical, thus timing uncertainties associated with the reception of configuration information may have minimal to no impact.

The trigger counter may be configured to increment at the transmission sampling rate (e.g., 30.72 megahertz (MHz) in a 4G system) to facilitate tracking of slot and symbol boundaries. With the trigger counter incrementing at the transmission sampling rate, the amount of time between each increment (referred to as the "increment period") may correspond with the amount of time between each sample (referred to as the "sample period"). The trigger counter may be configured to reset after counting to the number of samples that correspond with a particular subframe and then resume counting. Accordingly, the trigger counter may be based on the transmission time slot of a subframe due to the trigger counter incrementing each time a sample is taken and resetting after the number of samples corresponding with a subframe is taken.

For example, at the sampling rate of 30.72 MHz, a counter value of 30719 of a counter starting at zero and incrementing at the sampling rate may correspond with one subframe in a 4G system. Therefore, in a 4G system the trigger counter may reset to zero after the counter reaches 30719 and then begin counting to 30719 again.

Additionally the trigger counter may be reset (e.g., set to "0") when element 200 is powered on, when element 200 undergoes an adaptive discontinuous reception (DRX) cycle, or when baseband IC 402 directs RFIC 404 to reset the counter. In some instances baseband IC 402 may direct RFIC 404 to reset the counter during a handover from a 2G or 3G network to a 4G network due to different clock rates in the different networks. In such instances, the counter may not begin counting until initiated to do so upon the transmission of a reference subframe.

Configuration information received from baseband IC 402 and associated with a subsequent subframe may include timing adjustment information indicating where in the counter cycle the subsequent subframe should be sent. The timing adjustment information may correspond with a counter value, and when the counter reaches the value that corresponds with the timing adjustment information, RFIC 404 may generate a timing trigger for transmitting the subsequent subframe. A timing trigger based on the trigger timer may be referred to as a "timing accurate trigger" because the trigger may not have the timing uncertainties of other triggers.

For example, the timing adjustment information may indicate that a subsequent subframe should be sent when the counter value is at zero "0." Therefore, when the counter value reaches "0" RFIC 404 may be configured to generate the timing trigger. In the present example, with the counter corresponding with the transmission time of a subframe, a timing trigger corresponding with the counter being at "0" may correspond with an "on-time" transmission. The term "on-time" may merely indicate a transmission that may be sent in accordance with slot and symbol boundaries of subframes. In some instances it may be advantageous to transmit subframes either earlier than "on-time" or later than "on-time." This may be referred to as an advance in timing or a delay in timing. The timing adjustment associated with a counter value may be adjusted accordingly such that subsequent subframes may be transmitted "on-time," with a delay or in advance. Timing adjustments may be advantageous in situations where the distance to the element receiving the transmitted subframe may change. For example, element 200 may comprise a terminal 110 transmitting to a base station while also moving (e.g., travelling in a car), such that the distance between element 200 and the base station may change.

Figure 3:
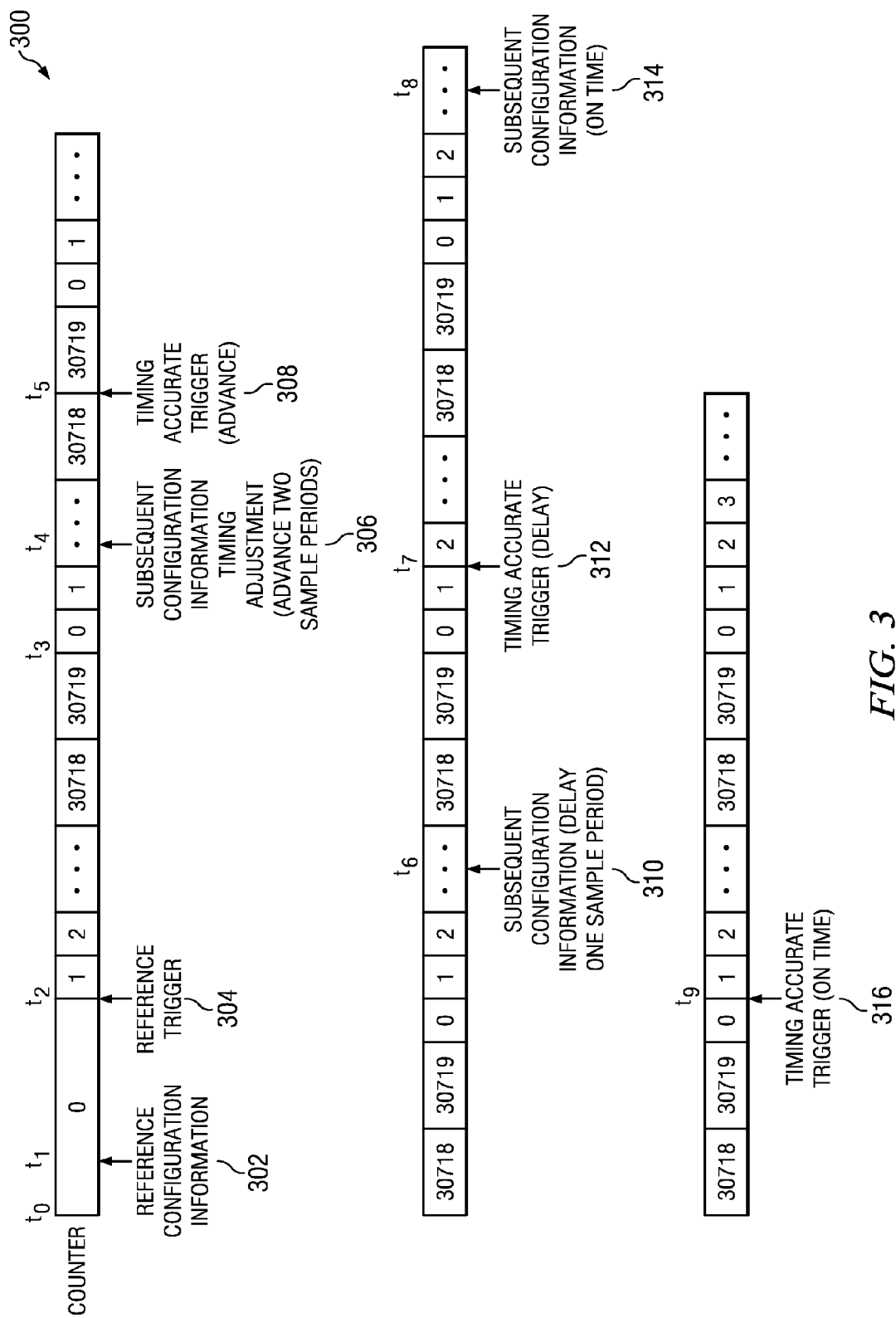
FIG. 3 illustrates an example timing diagram of a trigger counter and timing triggers associated with the trigger counter.

FIG. 3 illustrates an example timing diagram of a trigger counter 300 and timing triggers associated with trigger counter 300. The timing diagram may include a reference timing trigger 304, an "on-time" timing accurate trigger 316, a delayed timing accurate trigger 312 and an advanced timing accurate trigger 308.

Trigger counter 300 may be included in RFIC 404. In some embodiments, trigger counter 300 may comprise a transmission trigger counter configured to control the timing of transmitting subframes by element 200 associated with RFIC 404. In other embodiments, trigger counter 300 may comprise a receiving trigger counter configured to control the timing of receiving subframes by element 200 associated with RFIC 404. In the present example, the operations may be described with respect to the timing of transmitting subframes, but it is understood that the same or similar operations may be performed to control the timing of any other suitable data transfer, (e.g., receiving subframes).

In the present example, trigger counter 300 may be configured according to a 4G network with a sampling rate of 30.72 MHz. Additionally, each subframe of the network may correspond with 30,720 samples. Accordingly, counter 300 may be configured to increment at 30.72 MHz and may increment from 0 to 30719 and after reaching 30719 may reset to 0 and begin counting again.

At time $t_0$, RFIC 404 may reset trigger counter 300 as directed by baseband IC 402. As previously described, baseband IC 402 may direct RFIC 404 to reset trigger counter 300 at power on, a DRX cycle or for another reason. After being reset by RFIC 404 counter 300 may not begin counting until indicated to do so. At time $t_1$ RFIC 404 may receive reference configuration information 302 from baseband IC 402. RFIC 404 may accordingly prepare to transmit a reference subframe.

At time $t_2$ RFIC 404 may receive a reference trigger 304 from baseband IC 402. In some embodiments, reference trigger 304 may comprise a TAS. Upon receiving reference trigger 304 at time $t_2$, RFIC 404 may start trigger counter 300. RFIC 404 may also enable the transceiving element associated with RFIC 404 to transmit the reference subframe at time $t_2$. In the present example, the transceiving element associated with RFIC 404 may comprise a handheld terminal (e.g., a terminal 110) and at time $t_2$ the element may transmit the reference subframe to a base station (e.g., a base station 120) based on reference trigger 304.

At time $t_3$, it can be seen that trigger counter 300 may reset to "0" after reaching 30719 such that trigger counter 300 may correspond with the slot time of the subframes being transmitted.

At time $t_4$, RFIC 404 may receive from baseband IC 402 subsequent configuration information 306 associated with a subsequent subframe to be transmitted. Configuration information 306 may include timing adjustment information indicating that the subsequent subframe associated with configuration information 306 should be transmitted with a timing advance.

Baseband IC 402 may generate configuration information regarding timing adjustment information partially based on information it receives from the transceiving element (e.g., base station 120) that receives a subframe from the transceiving element associated with baseband IC 402. For example, as mentioned above, at time $t_2$ the reference subframe may be sent to a base station (e.g., a base station 120) and the base station may receive the reference subframe later than at an expected time. The base station may convey to baseband IC 402 that the timing of the reference subframe within the subframe slot time was late by two subframe samples. The reference subframe may arrive at the base station late due to timing inaccuracies associated with reference trigger 304, due to the transceiving element moving away from the base station, due to another factor, or any combination thereof. Baseband IC 402 may consequently send to RFIC 404 configuration information 306 with timing adjustment information that indicates that the timing of transmission of the subsequent subframe should be advanced by two sample periods.

At time $t_5$, based on configuration information 306, RFIC 404 may generate an advanced timing accurate trigger 308 when the counter is at "30718," which may be two increments (corresponding with two sample periods) earlier than an "on-time" transmission when the trigger counter would be at "0." Based on timing accurate trigger 308, RFIC 404 may enable the transceiving element to transmit the subsequent subframe associated with configuration information 306 at time $t_5$.

At time $t_6$, RFIC 404 may receive from baseband IC 402 configuration information 310 associated with another subsequent subframe. Subsequent configuration information 310 may include timing adjustment information indicating that the subframe associated with configuration information 310 should be delayed.

The base station may determine that the subframe sent at time $t_5$ was received earlier than expected (e.g., due to the transceiving element moving toward the base station) and may indicate such in a message received by baseband IC 402. Baseband IC 402 may accordingly send to RFIC 404 configuration information 310 indicating that the transmission timing of the subsequent subframe should be delayed. In the present example, configuration information 310 may include adjustment data indicating that the subsequent subframe should be delayed by one sample period. Accordingly, at time $t_7$, RFIC 404 may generate a delayed timing accurate trigger 312 when counter 300 is at "1," which may be one increment (corresponding with one sample period) later than an "on-time" transmission when the trigger counter would be at "0." Based on timing accurate trigger 312, RFIC 404 may enable element 200 to transmit the subsequent subframe associated with configuration information 310 at time $t_7$.

At time $t_8$, baseband IC 402 may transmit configuration information 314 to RFIC 404. Configuration information 314 may include adjustment data indicating that the subsequent subframe associated with configuration information 314 may be sent "on-time." Similarly to configuration information 306 and 310, baseband IC 402 may determine the adjustment data according to information received from a base station or any other transceiving element receiving data from the transceiving element associated with baseband IC 402 and RFIC 404.

At time $t_9$, RFIC 404 may generate an "on-time" timing accurate trigger 316 when counter 300 is at "0" based on the adjustment data indicating an "on-time" transmission. Based on timing accurate trigger 316, RFIC 404 may enable element 200 to transmit the subsequent subframe associated with configuration information 314 at time $t_9$.

Modifications, additions or omissions may be made to FIG. 3 without departing from the scope of the present disclosure. For example, the timing adjustments for each subframe may be larger or smaller than those depicted. Additionally, more or fewer subframes may be transmitted from the transceiving element having different timing adjustments than those discussed. Further, although the examples described operations with respect to the timing of subframe transmission, similar operations and methods may be used with respect to the timing subframe reception. Also, although the present example is described with respect to a transceiving element that comprises a terminal transmitting subframes to a base station, it is understood that the above operations and methods may be used in any suitable communications system to reduce data transfer timing uncertainties.

Figure 4:
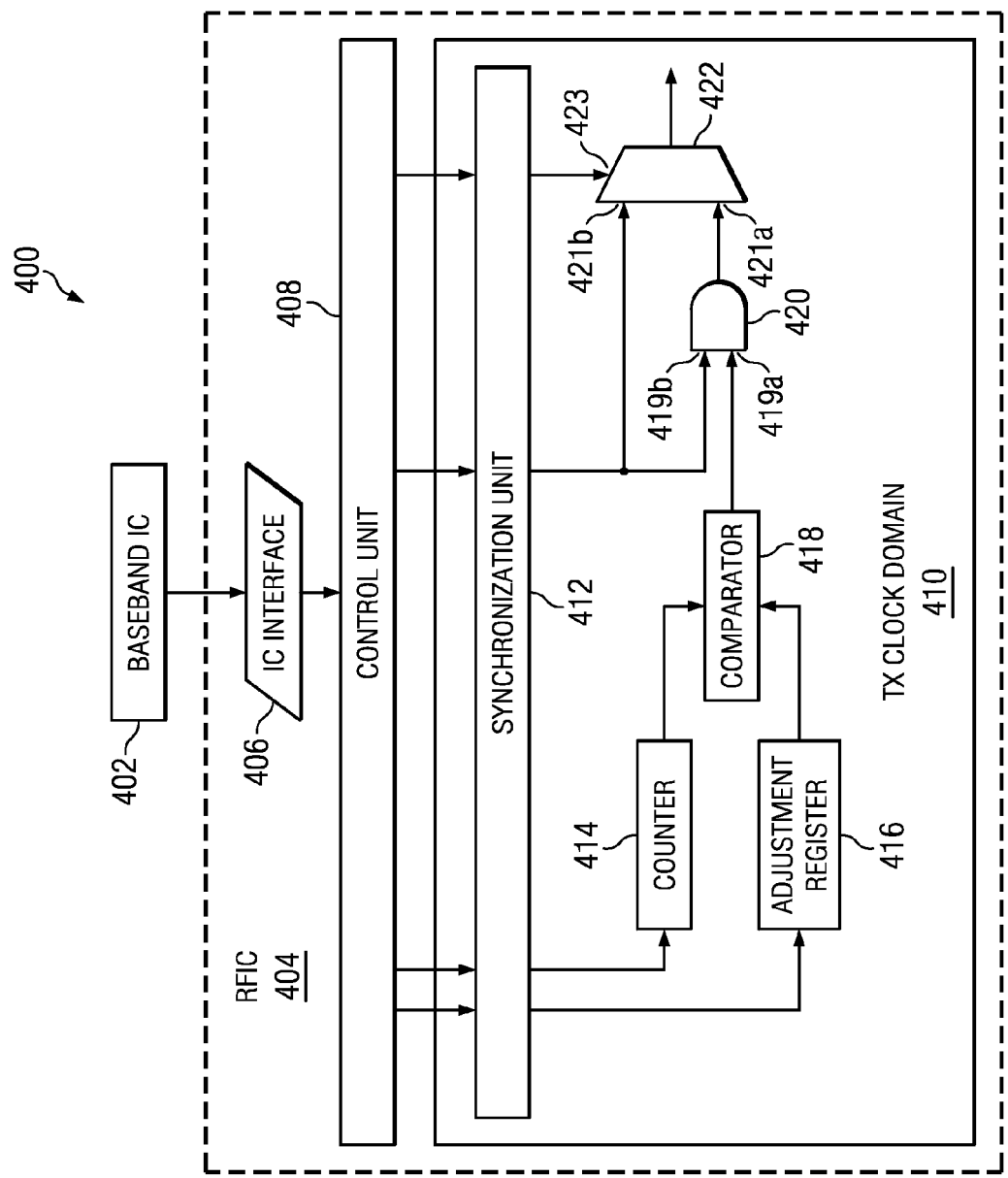
FIG. 4 illustrates an example system configured to reduce timing uncertainties for data transfers.

FIG. 4 illustrates an example system 400 configured to reduce timing uncertainties for transmission and reception of data. System 400 may be implemented in any suitable system, apparatus or device to reduce timing uncertainties. System 400 may be implemented in a transmitting, receiving or transceiving element of a communications network, such as an element 200 of FIG. 2. System 400 may be implemented in any suitable network or system where it may be advantageous to reduce timing uncertainties. In the present example, the operations of system 400 are described with respect to controlling the timing of transmission of signals, but it is understood that a system similar to system 400 may be configured to control the timing of any other data transfer such as the reception of signals also.

System 400 may include a baseband IC 402 and an RFIC 404. Baseband IC 402 and RFIC 404 may respectively have the same functionality as baseband IC 402 and RFIC 404 of digital circuitry 202 described with respect to FIGS. 2 and 3. Baseband IC 402 may be configured to send packet transmission information to RFIC 404, including configuration information and timing triggers such as time accurate strobes (TAS).

RFIC 404 may include an integrated circuit interface 406 configured to act as an interface between RFIC 404 and baseband IC 402. RFIC 404 may also include a control unit 408 configured to generate control signals according to instructions received by RFIC 404 from baseband IC 402.

RFIC 404 may additionally include components that run off of a transmission clock and are accordingly within a transmission clock domain 410. The components of RFIC 404 within transmission clock domain 410 may include a synchronization unit 412, a trigger counter 414, an adjustment register 416, a comparator 418, an AND gate 420 and a multiplexer (MUX) 422. As discussed in further detail below, control unit 408 may be configured to control operations of these components included within transmission clock domain 410 such that accurate timing of the transmission of data (e.g., subframes) may be accomplished.

Although not expressly shown, it is understood that RFIC 404 may also include a reception clock domain associated with data reception by the transceiving element associated with RFIC 404. The reception clock domain may be substantially similar to transmission clock domain 410 and may include a trigger counter, an adjustment register, a comparator, an AND gate and a multiplexer similarly configured to more accurately control the timing of data reception by the transceiving unit according to instructions received from control unit 408.

RFIC 404 may be configured to receive the packet transmission information from baseband IC 402 at an integrated circuit (IC) interface 406. IC interface 406 may comprise a component configured to provide a standardized means for data transmission between baseband IC 402 and RFIC 404. For example, configuration interface 406 may comprise an interface having specifications according to the Mobile Industry Processor Interface (MIPI) Alliance such as a DigRF 3G interface, a DigRF v4 interface or both. IC interface 406 may operate in a different clock domain than baseband IC. Therefore, any timing triggers (e.g., TAS's) that are transferred from baseband IC 402 to IC interface 406 may require one or more timing resynchronizations that may introduce timing uncertainties with respect to the timing trigger.

IC interface 406 may be coupled to a control unit 408 also included in RFIC 404. IC interface 406 may send transmission information received from baseband IC 402 to control unit 408. Control unit 408 and IC interface 406 may also function on separate clock domains such that timing uncertainties may occur during the transfer of timing triggers from IC interface 406 and control unit 408.

Control unit 408 may process the information included in the received transmission information to generate a series of control signals related to transmitting a subframe of information. Control unit 408 may be coupled to other components of RFIC 404 (e.g., counter 414, adjustment register 416, AND gate 420 and MUX 422) such that control unit 408 may control the operations of those components. In some instances, control unit 408 may control the operations of those components according to instructions included in the transmission information generated by baseband IC 402 and transmitted to control unit 408 via IC interface 406.

Control unit 408 may be communicatively coupled to components included within transmitting clock domain 410 included in RFIC 404. Control unit 408 may be communicatively coupled to trigger counter 414, adjustment value register 416, AND gate 420 and MUX 422 via synchronization unit 412.

Control unit 408 may operate in a different clock domain than transmission clock domain 410, therefore, synchronization unit 412 may comprise any suitable system, apparatus or device configured to receive control signals from control unit 408 and synchronize those signals with the transmission clock domain. Synchronization unit 412 may be communicatively coupled between control unit 408 and trigger counter 414, adjustment register 416, AND gate 420 and multiplexer 422 such that control signals may pass to these components from control unit 408 via synchronization unit 412.

Trigger counter 414 may comprise any suitable counter configured to increment a counter value at a particular rate (e.g., a sampling rate of 30.72 MHz in a 4G system) and to reset and begin counting again after reaching a particular value. In some embodiments, trigger counter 414 may be configured to count to the number of samples associated with a subframe, reset after counting to that number, count to that number again and repeat until instructed otherwise (e.g., counting from "0" to "30719" then returning to "0" and repeating).

Trigger counter 414 may be configured to reset to zero upon receiving a "reset" command from control unit 408. Control unit 408 may generate and transmit a "reset" command upon powering on of the transceiving element, when the transceiving element undergoes a DRX cycle, or upon receiving directions from baseband IC 402, via IC interface 406, requiring a reset. Additionally, trigger counter 414 may be configured to begin counting upon receiving an initiation command from control unit 408. Control unit 408 may generate the initiation command upon receiving a reference trigger (e.g., reference trigger 304 of FIG. 3) from baseband IC 402.

Adjustment value register 416 may comprise any suitable system, apparatus or device configured to receive a value, store that value and output the value. Adjustment register 416 may be configured to store a value matching the counter value associated with when a timing accurate trigger should be sent. The counter value associated with when the timing accurate trigger should be sent may be referred to as a "trigger value." For example, for an "on-time" transmission of a subframe following a reference subframe (a subsequent subframe), the trigger value may be "0." Therefore, adjustment register 416 may store and output a "0" to match the trigger value.

Control unit 408 may be configured to send the appropriate trigger value to adjustment register 416 according to timing adjustment information included in configuration information associated with a subsequent subframe (e.g., configuration information 306, 310 and 314 of FIG. 3) as received from baseband IC 402.

For example, upon receiving timing adjustment information indicating an "on-time" trigger, control unit 408 may send a trigger value of "0" to adjustment register 416 indicating that the timing trigger should be sent when counter 414 is at "0." As another example, upon receiving timing adjustment information indicating a transmission delay by one sample period, control unit 408 may send a trigger value of "1" to adjustment register 416 indicating that the timing trigger should be sent when counter 414 is at "1," thus delaying the trigger timing by one increment or sample period. As a further example, upon receiving timing adjustment information indicating a transmission advance by two sample periods (in an example configuration for a 4G system) control unit 408 may send a trigger value of "30718" to adjustment register 416 indicating that the timing trigger should be sent when counter 414 is at "30718," thus advancing the trigger timing by two increment or sample periods.

Comparator 418 may be communicatively coupled to counter 414 and adjustment register 416 and may be configured to receive the counter value from counter 414 and the trigger value from adjustment register 416. Comparator 418 may comprise any suitable system, apparatus or device configured to compare the counter value and the trigger value and transmit a signal when the two values match. For example, for an "on-time" trigger, the trigger value may be "0" and comparator 418 may compare the "0" with the value of counter 414. When counter 414 reaches "0" such that the counter value matches the trigger value, the output of comparator 418 may set or go "HIGH" indicating such. When the counter value changes such that the trigger value and the counter value are not equal, the comparator may "unset" or go "LOW" indicating such. The signal sent by comparator 418 when the trigger value and the counter value are equal may comprise a timing accurate trigger.

Comparator 418 may be communicatively coupled to AND gate 420 such that the output of comparator 418 is received at an input terminal 419a of AND gate 420. Input terminal 419b of AND gate 420 may be communicatively coupled to control unit 408, via synchronization interface 420, and may be configured to receive controls from control unit 408. Control unit 408 may be configured to control the operations of AND gate 420 via input terminal 419b such that AND gate 420 may ensure that timing accurate triggers are being sent at the appropriate time.

In some instances counter 414 may continue counting to its indicated number, reset, count to the number again and repeat. Adjustment value register 416 may also continue outputting the trigger value such that every time counter 414 reaches the trigger value, comparator 418 may generate a trigger that is sent to terminal 419a of AND gate 420. However, it may not be appropriate to transmit data every time counter 414 reaches the trigger value. Accordingly, AND gate 420 and control unit 408 may be configured such that the timing accurate trigger is transmitted at the appropriate times.

In the present example, upon receiving configuration information in anticipation for a subframe to be transmitted, control unit 408 may be configured to generate a control signal and transmit that signal to terminal 419b of AND gate 420 such that input terminal 419b is set "HIGH." Therefore, when the counter value and the trigger value are the same such that the output of comparator 418 goes "HIGH," input terminal 419a may also go "HIGH." With both input terminals 419a and 419b being set "HIGH" the output of AND gate 420 may set "HIGH" and the timing accurate trigger may pass through AND gate 420. In the present embodiment, control unit 408 may send the "HIGH" signal to input port 419b in the form of a timing trigger that is sent early. In some embodiments, the timing trigger may be sent along the same control line as a timing trigger transmitted from control unit 408 upon receiving the timing trigger from baseband IC 402.

After the data associated with the timing accurate trigger and the configuration information is set, control unit 408 may send another control signal to input terminal 419b that sets terminal 419b "LOW." Therefore, if the output of comparator 418 goes "HIGH," which may set terminal 419a "HIGH," when data transmission is not appropriate, the output of AND gate 420 may be "LOW" which may prevent data transmission at an inappropriate time.

The output of AND gate 420 may be communicatively coupled to input terminal 421a of MUX 422. Control unit 408 may be communicatively coupled to an input terminal 421b of MUX 422 such that timing triggers transmitted by control unit 408 based on timing triggers received from baseband IC 402 (e.g., a reference trigger) are received at input terminal 421b. Therefore MUX 422 may be configured to receive timing accurate triggers from AND gate 420 at terminal 421a and other timing triggers, such as reference triggers, from control unit 408 at terminal 421b.

MUX 422 may be configured to output the timing accurate trigger from AND gate 420 or the timing trigger from control unit 408. Control unit 408 may be communicatively coupled to MUX 422 at a select line 423 and MUX 422 may be configured to select between outputting signals received at input terminal 421a or input terminal 421b according to a control signal received from control unit 408 at select line 423. Therefore, MUX 422 may be configured to output timing accurate triggers received at input terminal 421a from AND gate 420 or other timing triggers (e.g., a reference trigger) received at input terminal 421b from control unit 408.

For example, upon receiving configuration information associated with a reference subframe (e.g., configuration information 302 of FIG. 3) control unit 408 may determine that the reference subframe may be transmitted upon receiving a reference trigger from baseband IC 402. As discussed above, the transmission may be based on the reference trigger from baseband IC 402 because counter 414 may not be initiated yet. Therefore, control unit 408 may send a control signal to select line 423 indicating that signals received at input terminal 421b are to be outputted. Therefore, when MUX 422 receives a reference trigger from control unit 408, MUX 422 may output the reference trigger, and the transceiving element may begin data transmission based on the reference trigger.

In the present embodiment, control unit 408 may be coupled to input ports 419b and 421b at the same control line, such that the same control signals are received at both input ports 419a and 421b. However, the present disclosure should not be limited to such. In alternative embodiments, control unit 408 may be coupled to input port 419b of AND gate 420 via one control line and control unit 408 may be coupled to input port 421b of MUX 422 via another control line.

As another example, upon receiving configuration information associated with a subframe to be transmitted after counter 414 has been initiated (e.g., a subsequent subframe), control unit 408 may send a control signal to select line 423. The control signal may indicate that signals received at input terminal 421a are to be outputted. Therefore when MUX 422 receives a timing accurate trigger from AND gate 420 at input terminal 421a, MUX 422 may output the timing accurate trigger and the transceiving element may begin data transmission based on the timing accurate trigger.

Modifications, additions or omissions may be made to system 400 without departing from the scope of the present disclosure. For example, some embodiments may not include an AND gate 420 and control unit 408 may be configured to prevent the improper transmission of timing triggers from comparator 418 by controlling the output of MUX 422 via select line 422. Additionally, although specific components are described performing specific functions, it is understood that any suitable component for performing one or more operations described herein may be used. Further, as mentioned above, although not explicitly shown, the transceiving element associated with system 400 may also include a similar system configured to control the timing of data reception by the transceiving element. Further baseband IC 402 and RFIC 404 may include more or fewer components than those depicted. For example, RFIC 404 may also include DAC 204, upconverter 208, VGA 214, oscillator 210, ADC 224, filter 238, downconverter 228 and LNA 234 as depicted in FIG. 2.

Figure 5:
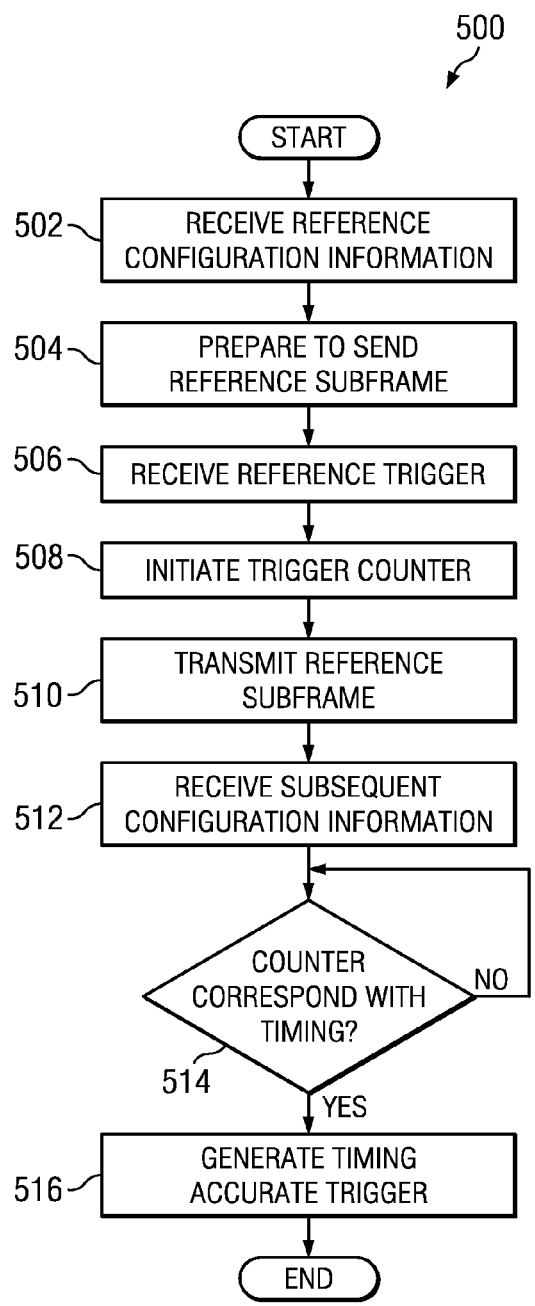
FIG. 5 illustrates an example flow diagram of a method for reducing timing inaccuracies in data transfers.

FIG. 5 illustrates an example flow diagram of a method 500 for reducing timing inaccuracies in data transmission and reception. For descriptive purposes, method 500 is described with respect to the timing of data transmission, but it is understood that similar steps may be performed in controlling the timing of data reception. Additionally, it is understood that method 500 may be performed by any suitable system, apparatus or device that may receive instructions and perform operations according to those functions.

In certain embodiments, method 500 may be implemented partially or fully in software, firmware, or other logic embodied in tangible computer readable media. As used in this disclosure, "tangible computer readable media" means any instrumentality, or aggregation of instrumentalities that may retain data and/or instructions for a period of time. Tangible computer readable media may include, without limitation, random access memory (RAM), read-only memory (ROM), electrically erasable programmable read-only memory (EEPROM), a PCMCIA card, flash memory, direct access storage (e.g., a hard disk drive or floppy disk), sequential access storage (e.g., a tape disk drive), compact disk, CD-ROM, DVD, and/or any suitable selection of volatile and/or non-volatile memory and/or a physical or virtual storage resource.

In the present example, method 500 may be performed by an integrated circuit having a processor communicatively coupled to memory wherein the processor may be configured to perform the operations according to instructions stored on the memory. The integrated circuit may also include components communicatively coupled to the processor and configured to perform operations according to instructions received by the processor. In the present example, method 500 may be performed by an RFIC of a transceiving element of a wireless communications network.

Method 500 may start at step 502 where an RFIC may receive reference configuration information from a baseband IC. At step 504, the RFIC may prepare to send a reference subframe based on the reference configuration information.

At step 506, the RFIC may receive a reference trigger from the baseband IC. At step 508, in response to receiving the reference trigger, the RFIC may initiate a trigger counter. At step 510, the RFIC may transmit the reference subframe in response to receiving the reference trigger. It is understood that steps 508 and 510 may be performed at approximately the same time.

At step 512, the RFIC may receive configuration information associated with transmitting a subsequent subframe after transmitting the reference subframe and initiating the counter. The configuration information may include timing adjustment information that indicates at which value of the counter a timing trigger should be generated and sent. The RFIC may also set an adjustment value that may be substantially equal to the appropriate counter value for subframe transmission timing.

At step 514, the RFIC may determine whether the counter value corresponds with the adjustment value. If the counter value does not correspond with the adjustment value, the RFIC may repeat step 514 until it does. If the counter value does correspond with the adjustment value, method 500 may advance to step 516.

At step 516, the RFIC may generate the timing accurate trigger, and the transceiving element may begin transmitting the subframe. Following step 516 method 500 may end.

Modifications, additions, or omissions may be made to method 500 without departing from the scope of the present disclosure. For example, although the steps are described as being performed in a particular order in some instances one or more steps may be performed in a different time or more than one step may be performed at the same time. Further, although the present method specifically describes transmitting subframes of data by a transceiving device in a wireless communications system, method 500 may be implemented in any suitable system, apparatus, or device where accurate timing of data transmission or reception may be advantageous.

Although the present disclosure and its advantages have been described in detail, it should be understood that various changes, substitutions and alterations can be made herein without departing from the spirit and scope of the disclosure as defined by the following claims.

What is claimed is:

1. A wireless communication element comprising:
a first controller configured to:
operate within a first clock domain; and
generate data transfer information indicating a reference trigger and a trigger adjustment value; and
a second controller communicatively coupled to the first controller, and comprising a counter configured to increment a counter value, the second controller configured to:
receive the data transfer information from the first controller;
initiate a transfer of a reference subframe with a second wireless communication element based on the reference trigger;
start the counter upon the transfer of the reference subframe;
generate a data transfer trigger based on the counter value and the trigger adjustment value; and
initiate a data transfer of a data subframe with the second wireless communication element based on the data transfer trigger;
the counter configured to operate within a second clock domain separate from the first clock domain of the first controller.

2. The wireless communication element of claim 1, wherein the data transfer comprises the wireless communication element transmitting the data subframe to the second wireless communication element.

3. The wireless communication element of claim 1, wherein the data transfer comprises the wireless communication element receiving the data subframe from the second wireless communication element.

4. The wireless communication element of claim 1, wherein the second controller is configured to reset the counter such that the counter resets and does not increment according to an event selected from the group consisting of powering on of the wireless communication element, an adaptive discontinuous reception cycle (DRX), and reception by the second controller from the first controller of instructions indicating a reset of the counter.

5. The wireless communication element of claim 1, wherein the counter is configured to increment the counter value at a sampling rate of the data subframe.

6. The wireless communication element of claim 1, wherein the counter is configured to reset and increment when the counter value corresponds with a data transfer time slot of the data subframe.

7. The wireless communication element of claim 1, wherein the trigger adjustment value is configured to advance timing of the data transfer trigger.

8. The wireless communication element of claim 1, wherein the trigger adjustment value is configured to delay timing of the data transfer trigger.

9. The wireless communication element of claim 1, wherein the trigger adjustment value is based on information received by the wireless communication element from the second wireless communication element.

10. The wireless communication element of claim 1, wherein the first controller is part of a digital baseband circuit and the second controller is part of a radio frequency circuit.

11. A method for timing data transfers of a wireless communication element comprising:
   receiving, from a first controller operating within a first clock domain, by a second controller operating within a second clock domain separate from the first clock domain, data transfer information indicating a reference trigger and a trigger adjustment value, the second controller comprising a counter;
   incrementing, by the counter operating within the second clock domain, a counter value of the counter;
   transferring, by the second controller, a reference subframe with a second wireless communication element based on the reference trigger;
   starting the counter upon the transfer of the reference subframe;
   generating, by the second controller, a data transfer trigger based on the counter value and the trigger adjustment value; and
   transferring a data subframe with the second wireless communication element based on the data transfer trigger.

12. The method of claim 11, wherein transferring the data subframe comprises transmitting the data subframe to the second communication element.

13. The method of claim 11, wherein transferring the data subframe comprises receiving the data subframe from the second communication element.

14. The method of claim 11, further comprising resetting, by the second controller, the counter such that the counter resets and does not increment according to an event selected from the group consisting of powering on of the communication element, an adaptive discontinuous reception cycle (DRX), and reception, by the second controller, of instructions indicating a reset of the counter.

15. The method of claim 11, further comprising incrementing the counter value at a sampling rate of the data subframe.

16. The method of claim 11, further comprising resetting the counter when the counter value corresponds with a data transfer time slot of the data subframe.

17. The method of claim 11, wherein the trigger adjustment value is configured to advance timing of the data transfer trigger.

18. The method of claim 11, wherein the trigger adjustment value is configured to delay timing of the data transfer trigger.

19. The method of claim 11, wherein the trigger adjustment value is based on information received by the communication element from the second communication element.

20. The method of claim 11, wherein the second controller is part of a radio frequency circuit of the communication element, and wherein the data transfer information is received by the second controller from a digital baseband circuit of the communication element.

* * * * *